United States Patent
DeBar et al.

(10) Patent No.: US 6,843,121 B1
(45) Date of Patent: *Jan. 18, 2005

(54) MEASURING ABSOLUTE STATIC PRESSURE AT ONE OR MORE POSITIONS ALONG A MICROFLUIDIC DEVICE

(75) Inventors: Michael J. DeBar, Rochester, NY (US); Zhihao Yang, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/647,360

(22) Filed: Aug. 25, 2003

(51) Int. Cl.⁷ .............................. G01F 5/00; G01L 7/18
(52) U.S. Cl. .................................. 73/202; 73/747
(58) Field of Search ................ 73/706, 715, 726, 73/727, 756, 747, 202

(56) References Cited

U.S. PATENT DOCUMENTS

| | | |
|---|---|---|
| 4,426,768 A | 1/1984 | Black et al. |
| 4,463,336 A | 7/1984 | Black et al. |
| 4,682,503 A | 7/1987 | Higashi et al. |
| 5,305,643 A | 4/1994 | Thomas et al. |
| 5,316,619 A | 5/1994 | Mastrangelo |
| 5,332,469 A | 7/1994 | Mastrangelo |
| 5,369,544 A | 11/1994 | Mastrangelo |
| 5,458,000 A | 10/1995 | Burns et al. |
| 5,528,939 A | 6/1996 | Martin et al. |
| 5,679,902 A | 10/1997 | Ryhanen |
| 5,808,210 A | 9/1998 | Herb et al. |
| 5,939,635 A | 8/1999 | Martin |
| 6,012,335 A | 1/2000 | Bashir et al. |
| 6,109,113 A | 8/2000 | Chavan et al. |
| 6,575,026 B1 | 6/2003 | DeBar et al. |

OTHER PUBLICATIONS

Manzet al, Micromachining of Monocrystalline Silicon and Glass for Chemical Analysis Systems, Trends in Analytical Chemistry, vol. 10, No. 5, 1991, pp144–149.

Frank White, Solutions of the Newtonian Viscous Flow Equations, Viscous Fluid Flow, Second Ed. pp. 119–121.

Manz et al, Planar Chips Technology for Miniaturization of Separation Systems: A Developing Perspective in Chemical Monitoring, Advances in Chromatography, vol. 33.

*Primary Examiner*—Edward Lefkowitz
*Assistant Examiner*—Andre Allen
(74) *Attorney, Agent, or Firm*—Raymond L. Owens

(57) ABSTRACT

A method of measuring absolute static pressure in a microfluidic device transporting a working fluid that is immiscible in a first selected gas environment, includes providing a first fluid conducting channel having an atmosphere provided by the first selected gas environment in a sealed environment and in communication with the microfluidic device at a first point of communication; providing a first sensing mechanism that is electrically interrogated, disposed adjacent to the first fluid conducting channel; and transporting the working fluid under pressure conducted by the microfluidic device into the first fluid conducting channel such that the volume transported into such first fluid conducting channel varies depending upon the absolute static pressure of the working fluid.

9 Claims, 4 Drawing Sheets

MEASURING ABSOLUTE STATIC PRESSURE AT ONE OR MORE POSITIONS ALONG A MICROFLUIDIC DEVICE

FIELD OF THE INVENTION

The present invention relates to measuring the absolute static pressure of fluid flowing in a microfluidic device.

BACKGROUND OF THE INVENTION

Conducting of fluid in microfluidic devices is frequently done in inkjet printers. It is also done in other types of microfluidic devices in fields not related to printing, for example, drug delivery and microscale biological and chemical analysis. In the inkjet printing field, ink is transported from a reservoir to a printhead, where it is sprayed onto print media. If a nozzle becomes clogged, the absolute static pressure within the relevant ejection chamber may exceed normal values. Thus, absolute static pressure detection can be used as a nozzle-by-nozzle diagnostic tool in the case of an inkjet printer. Similarly, absolute static pressure sensing in drug delivery systems is critical due to the potential hazards of inaccurate dosing. In microscale biological and chemical analysis systems, where precision is critical, an integrated absolute static pressure sensor reduces the error associated with sensing the absolute static pressure across an intervening volume between the microfluidic device and a non-integrated sensor; in addition, an integrated pressure sensor reduces the volume of fluid that must be sacrificed to measure the pressure. This increases cost and waste, and in the case of biological analysis systems, for example, it increases the required sample size, making sample collection and preparation more difficult and costly.

While prior art exists for pressure drop measurement across microfluidic and macrofluidic systems, even microscale measurement systems are integrated on the macroscale, allowing measurement of absolute static pressure as the working fluid enters or exits a microfluidic device, but not while the working fluid is within the interior of the microfluidic device. For example, U.S. Pat. No. 4,426,768 teaches the use of the measurement of a strain-dependent property to deduce the local absolute pressure of a non-conductive fluid. Similarly, U.S. Pat. No. 4,463,336 teaches the measurement of absolute gas pressure using the varying resistance of a narrow piezoresistive bridge. Electrically conductive liquids cannot be measured with this sensor. U.S. Pat. No. 4,682,503 teaches the use of measuring the varying thermal resistance of a silicon nitride bridge to the same end. This sensor does not work with an electrically conducting fluid, and struggles to provide accurate data with a fluid of high heat capacity. A number of sensors measuring pressure via the capacitance between a deforming membrane and a fixed electrode have been previously disclosed. U.S. Pat. Nos. 5,305,643; 5,316,619; 5,369,544 and 6,109,113 teach the measurement of absolute pressure against a standard (normally vacuum or the ambient atmosphere) by capacitance, while U.S. Pat. Nos. 5,332,469; 5,679,902 and 6,012,335 teach the use of capacitance to measure the relative difference of two varying pressures. In all cases, the region across which the field is applied must not be penetrated by any fluid with a different dielectric constant from that of the fluid originally between the two plates. U.S. Pat. No. 5,458,000 teaches the use of a second resonant sensor that is not affected by changes in pressure but responds to changes in temperature for use in temperature error compensation. This sensor will not operate in a viscous fluid. U.S. Pat. Nos. 5,528,939 and 5,939,635 teach the measurement of energy needed to move a resonant member near a stationary surface, where the damping losses are highly pressure dependent. This can only be used to measure a compressible working fluid, however, or the variation in damping force will not be evident. U.S. Pat. No. 5,808,210 teaches measurement of absolute pressure by measuring deformation either electrically or optically. While this sensor can be used for optical measurement of the membrane deflection, it cannot be used with an opaque working fluid.

U.S. Pat. No. 6,575,026 teaches the use of an integrated absolute static pressure sensor on a microchannel to measure absolute static pressures and flow rates, but requires optical interrogation of a visual scale for pressure determination. This process may be expensive to implement in an automated system due to the optical equipment required to observe such small features. In addition, if image analysis is necessary, computational power needs (and costs) may be substantial.

SUMMARY OF THE INVENTION

It is an object of the present invention to provide an improved way to measure the absolute static pressure in a microfluidic device transporting a working fluid.

This object is achieved in a method of measuring absolute static pressure at one or more positions along the wall of a microfluidic device transporting a working fluid that is immiscible in a first selected gas environment, comprising:

(a) providing a first fluid conducting channel having an atmosphere provided by the first selected gas environment in a sealed environment and in communication with the microfluidic device at a first point of communication;

(b) providing a first sensing mechanism that is electrically interrogated, disposed adjacent to the first fluid conducting channel; and (c) transporting the working fluid under pressure conducted by the microfluidic device into the first fluid conducting channel such that the volume transported into such first fluid conducting channel varies depending upon the absolute static pressure of the working fluid at the first point of communication, whereby the absolute static pressure at the first point of communication is electrically determined by the first sensing mechanism depending on the position of the interface of the working fluid and the first selected gas environment in the first fluid conducting channel.

It is an advantage of the present invention to output an electrical signal directly related to the volume in a first fluid conducting channel in communication with the microfluidic device to readily determine the absolute static pressure in the first fluid conducting channel without the need for moving parts.

It is a further advantage of the present invention to measure absolute static pressure over a variety of pressure ranges at the same point of communication, thereby increasing the effective absolute static pressure range of the sensor.

It is a further advantage of the present invention to measure absolute static pressure at a precise location within a microfluidic device.

DETAILED DESCRIPTION OF THE PREFERRED EMBODIMENT

Figure 1:
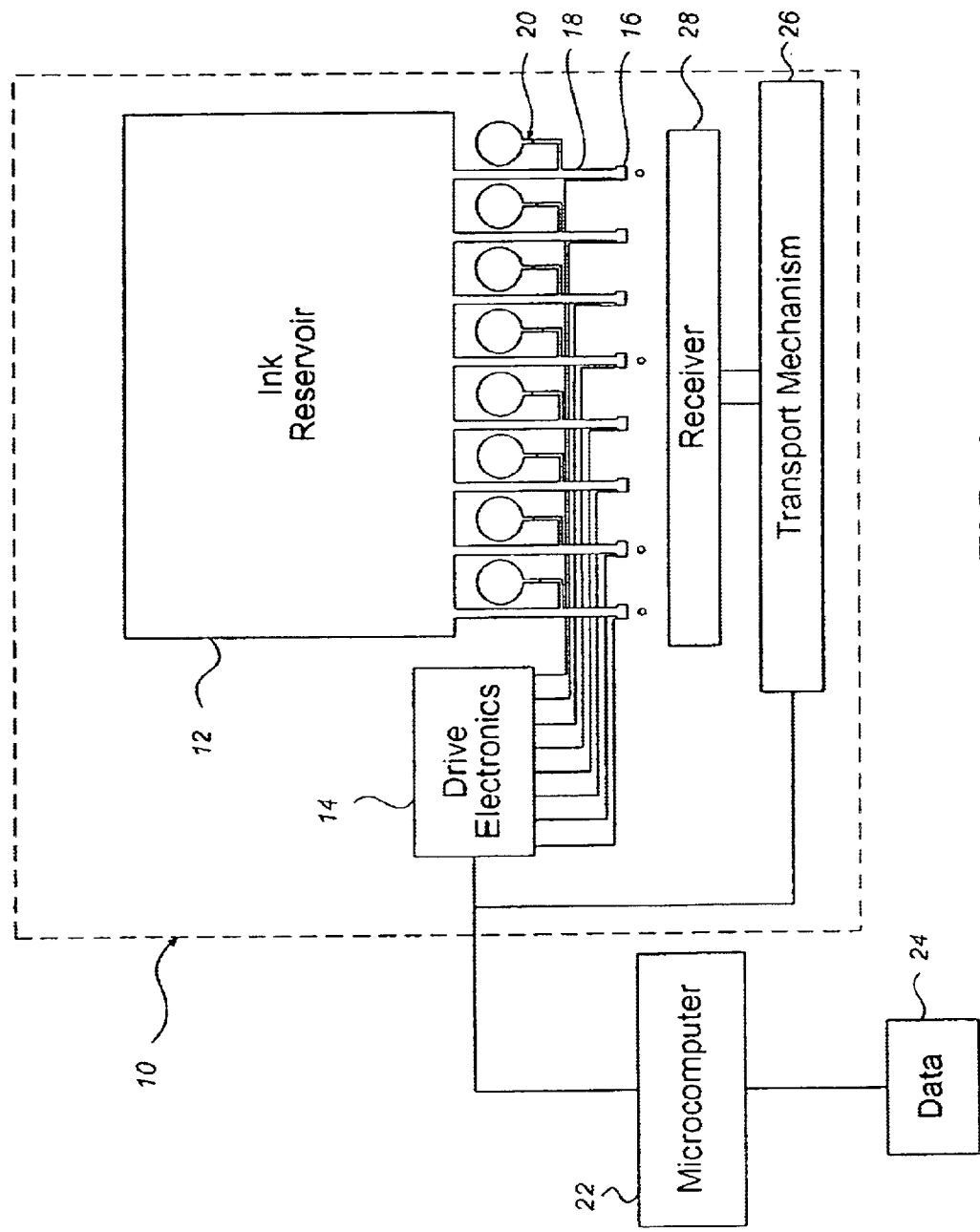
FIG. 1 depicts a schematic of an ink jet printing apparatus that has a microfluidic device in which the present invention is adapted to measure the absolute static pressure therein.

The term, "microfluidic", "microscale" or "microfabricated" generally refers to structural elements or features of a device, such as fluid channels, chambers or conduits, having at least one fabricated dimension in the range from about 0.1 μm to about 500 μm. In devices according to the present invention, the microscale channels or chambers preferably have at least one internal cross-section dimension, e.g., depth, width, length, diameter, etc., between about 0.1 μm to about 500 μm, preferably between about 1 μm to about 200 μm.

The microfluidic devices described in the present invention are preferably fabricated with the techniques commonly associated with the semiconductor electronics industry, e.g., photolithography, dry plasma etching, wet chemical etching, etc., on the surface of a suitable substrate material, such as silicon, glass, quartz, ceramics, as well as polymeric substrates, e.g., plastics.

Various techniques using chip technology for the fabrication of microfluidic devices, and particularly microcapillary devices, with silicon and glass substrates have been discussed by Manz, et al. (*Trends in Anal. Chem.* 1990, 10, 144, and *Adv. In Chromatog.* 1993, 33, 1). Other techniques such as laser ablation, air abrasion, injection molding, embossing, etc., are also known to be used to fabricate microfluidic devices, assuming compatibility with the selected substrate materials.

The present invention uses a method of measuring absolute static pressure at one or more positions along the wall of a microfluidic device transporting a working fluid that is immiscible in a first selected gas environment, comprising the steps of: providing a first fluid conducting channel having an atmosphere provided by the first selected gas under a sealed environment and in communication with the microfluidic device at a first point of communication; providing a first sensing mechanism that is electrically interrogated, disposed adjacent to the first fluid conducting channel; and transporting the working fluid under pressure conducted by the microfluidic device into the first fluid conducting channel such that the volume transported into such first fluid conducting channel varies depending upon the absolute static pressure of the working fluid at the first point of communication, whereby the absolute static pressure at the first point of communication is electrically determined from the first sensing mechanism depending on the position of the interface of the working fluid and the first selected gas environment in the first fluid conducting channel. If the volume occupied by the first selected gas environment is known at static conditions and the absolute static pressure is known under ambient conditions, then the absolute static pressure during operation is determined by the motion of the interface between the working fluid and the first selected gas environment, using, for example, the ideal gas law, PV=nRT, where P represents the absolute static pressure of the first selected gas environment, which is presumed to be related in a known way to the absolute static pressure of the working fluid at the first point of communication, V represents the volume occupied by the first selected gas environment, n represents the number of moles of gas in the first selected gas environment, R represents a universal gas constant, and T represents the absolute temperature of the first selected gas environment. For steady-state working fluid/selected gas environments, the following relation applies:

$$P_{fluid} = P_{gas} - \sigma\left(\frac{1}{R_1} + \frac{1}{R_2}\right)\cos\theta$$

where $P_{fluid}$ is the absolute static pressure of the working fluid at the point of communication; $P_{gas}$ is the absolute static pressure of the first selected gas environment; $R_1$ and $R_2$ are the local radii of curvature of the interface between the first selected gas environment and the working fluid; θ is the contact angle of the three-phase system formed by the working fluid, the first selected gas environment, and the wall of the microfluidic device; and σ is the surface tension of the three-phase system described above. In cases where the surface tension is very small, (σ→0), the absolute static pressure of the working fluid may be considered equal to the absolute static pressure of the selected gas environment. Hence, the present invention can measure absolute static pressure at a precise location within a microfluidic device.

More complex models that relate absolute static pressure, volume, and temperature to physical constants can also be used to improve accuracy. For example, the additional terms in the van der Waals or "real gas" equation (shown below) will improve accuracy for cases where a higher density of gas molecules causes stronger intermolecular interaction.

$$\left(P + \frac{C_1}{V^2}\right)(V - C_2) = nRT$$

In this equation the two additional constants $C_1$ and $C_2$ are determined by the type of gas in the first selected gas environment.

Turning now to FIG. 1, a schematic diagram is shown of a printing apparatus 10 including at least one ink reservoir 12, drive electronics 14, and a plurality of individually addressable printheads 16 in communication with both the ink reservoirs 12 and the drive electronics 14. Ink is introduced into each individually addressable printhead 16 by means of a microfluidic device 18, in this case a microfluidic channel, which in turn is in communication with an absolute static pressure sensor 20. A computer 22 receives or generates data 24 representing, for example, a digital image. The computer 22 also controls the output to the printing apparatus 10 by means of electrical signals to the drive electronics 14. The drive electronics 14 in turn control a transport mechanism 26, which conveys a receiver 28 to the individually addressable printheads 16 so that ink pixels may be transferred to the receiver 28. The ink flow may be controlled by any means including but not limited to thermal ejection, piezoelectric ejection, or electrostatic ejection. The computer 22 also controls the individually addressable printheads 16.

Figure 2:
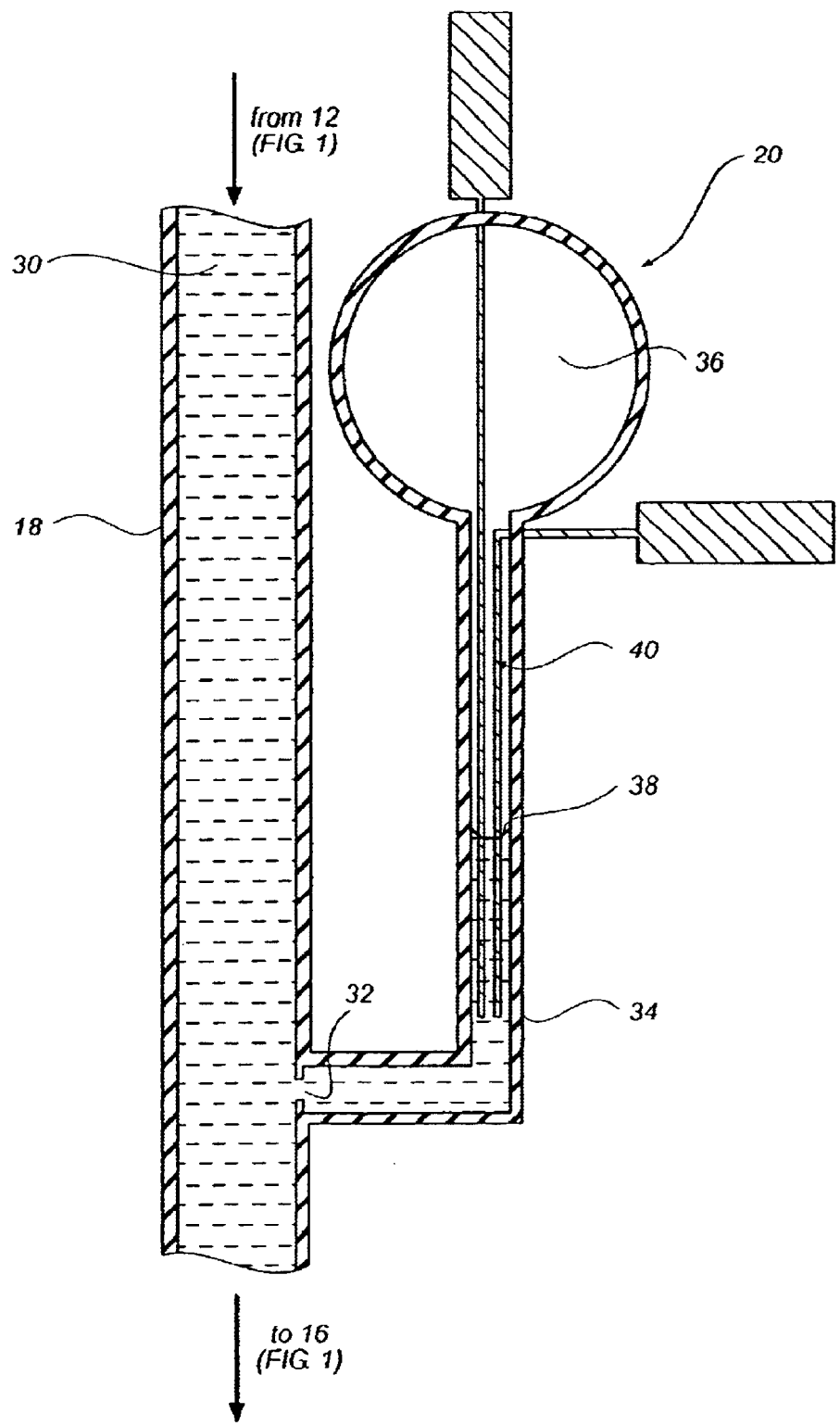
FIG. 2 is a schematic of a first embodiment of the present invention.

FIG. 2 depicts a first embodiment of the absolute static pressure sensor 20 shown in FIG. 1, that measures absolute static pressure in a working fluid 30 at the first point of communication 32 of a first fluid conducting channel 34 with the microfluidic device 18. The working fluid 30 may be, but is not limited to any of the following fluids: water, ink, ethylene glycol, methanol, ethanol, isopropanol, oil, acetone, an organic solvent, a biological fluid, or a solution of a chemical analyte, or a miscible combination of these. There are no restrictions on the optical properties of the working fluid 30. The first point of communication 32 should be kept as small as possible to minimize disruption to the flow in the microfluidic device 18; however, if the first point of communication 32 is too small, the response time of the absolute static pressure sensor 20 will become large, since equilibration of the absolute static pressure sensor 20 will be limited by the rate at which the working fluid 30 can flow through the first point of communication 32.

Generally, the placement of the absolute static pressure sensor 20 is that the first point of communication 32 should be located where the local working fluid velocity during normal operation is parallel to the plane of the first point of communication 32. If the working fluid 30 can exert momentum in the direction normal to the plane of the first point of communication 32, the absolute static pressure registered by the absolute static pressure sensor 20 will not be the absolute static pressure of the working fluid 30 at the first point of communication 32, but rather the absolute stagnation pressure of the working fluid 30 at the first point of communication 32, if the local fluid velocity vector is normal to the plane of the first point of communication 32, or some intermediate value between these two pressures if the local working fluid velocity vector impacts the plane of the first point of communication 32 at some angle between zero and ninety degrees.

In addition to the use of the present invention to measure the absolute static pressure in a microfluidic channel, the absolute static pressure sensor 20 can measure the absolute static pressure at any point in a microfluidic device 18. For example, the absolute static pressure of an ink chamber is measured by placing a first fluid conducting channel 34 in communication with the ink chamber.

When the individually addressable printhead 16 is primed with a working fluid 30 (in this case ink) before use by the drive electronics 14, the microfluidic device 18 will fill with fluid. Depending on the pressure used to prime the absolute static pressure sensor 20 and the ambient pressure conditions upon filling, a certain amount of gas will be trapped within the first fluid conducting channel 34, forming an atmosphere provided by the first selected gas environment 36 at the end of the first fluid conducting channel 34. The working fluid 30 is separated from the first selected gas environment 36 by a first interface 38. This first selected gas environment 36 includes air, nitrogen, argon, neon, helium, oxygen, hydrogen, water vapor, carbon monoxide, or carbon dioxide or a miscible combination of these. The limitations on the selected gas environment 36 are that the selected gas environment 36 must have a dielectric constant different from that of the working fluid 30, the selected gas environment 36 must be immiscible with the working fluid 30, and the selected gas environment 36 must be non-reactive in the presence of the working fluid 30. Similarly, for non-inkjet microfluidic devices, there will be an initial filling of the microfluidic device 18 generally accomplished by forcing the working fluid 30 through the microfluidic device 18 using an external pressure source. In order to use the absolute static pressure sensor 20, the initial volume of this first selected gas environment 36 must be determined by electrically interrogating the first sensing mechanism 40, disposed adjacent to the first fluid conducting channel 34, while the absolute static pressure sensor 20 is under ambient pressure. For example, if the sensing mechanism 40 were a capacitive element, its capacitance would vary linearly (for a first fluid conducting channel 34 of constant cross-section) with the position of a first interface 38, due to the difference in dielectric constant of the working fluid 30 and the selected gas environment 36. The design of such a sensing mechanism is well known to those skilled in the art. From the position of the first interface 38, the volume of the selected gas environment 36 is determined.

Using the initial volume, measured under ambient static conditions, and an equilibrium volume, subsequently measured while the microfluidic device is in operation, the operating absolute static pressure is determined. Since a fixed amount of gas (on a molar basis) is trapped within the first selected gas environment 36, the following relation for the operational absolute static pressure, $P_2$, holds under isothermal equilibrium conditions as a direct result of the ideal gas law:

$$P_2 = P_1 \frac{V_1}{V_2}$$

where $P_1$ is the ambient absolute static pressure (measured with, for example, an external barometer) at which $V_1$, the initial volume, is measured and $P_2$ is the operational absolute static pressure at which $V_2$, the operational volume, is measured. In addition to this rigorous determination of absolute static pressure under isothermal equilibrium conditions, the absolute static pressure sensor 20 can qualitatively determine the effectiveness of an individually addressable printhead 16 relative to its neighbors. If the first selected gas environment 36 of a certain absolute static pressure sensor 20 ceases to register changes in volume while the first selected gas environments of the absolute static pressure sensors 20 of all neighboring individually addressable printheads 16 continue to register fluctuations in volume, a defective or broken individually addressable printhead 16 is detected during operation. Similarly, if the volume fluctuations of the first selected gas environment 36 in one absolute static pressure sensor 20 indicate an inordinately large absolute static pressure change in one individually addressable printhead 16, a partial or total blockage of the microfluidic device 18 may have occurred. If one integrates electronic logic circuits that monitor the absolute static pressure in each individually addressable printhead 16, the printing apparatus 10 will have the ability to dynamically diagnose failure of certain individually addressable printheads 16 and direct the drive electronics 14 to correct for this failure. These benefits extend beyond the domain of inkjet printing into other applications. For example, a microfluidic device releasing a steady dose of a drug through a microfluidic needle, a sudden drop in absolute static pressure (rise in volume) would be indicative of a blockage upstream, or a failure of the ink reservoir 12 or other pressure source driving the flow. Conversely, a rise in absolute static pressure would indicate a blockage downstream, causing the entire microfluidic device 18 to equilibrate to a higher absolute static pressure, since the majority of the absolute static pressure loss would occur across the blockage.

Figure 3:
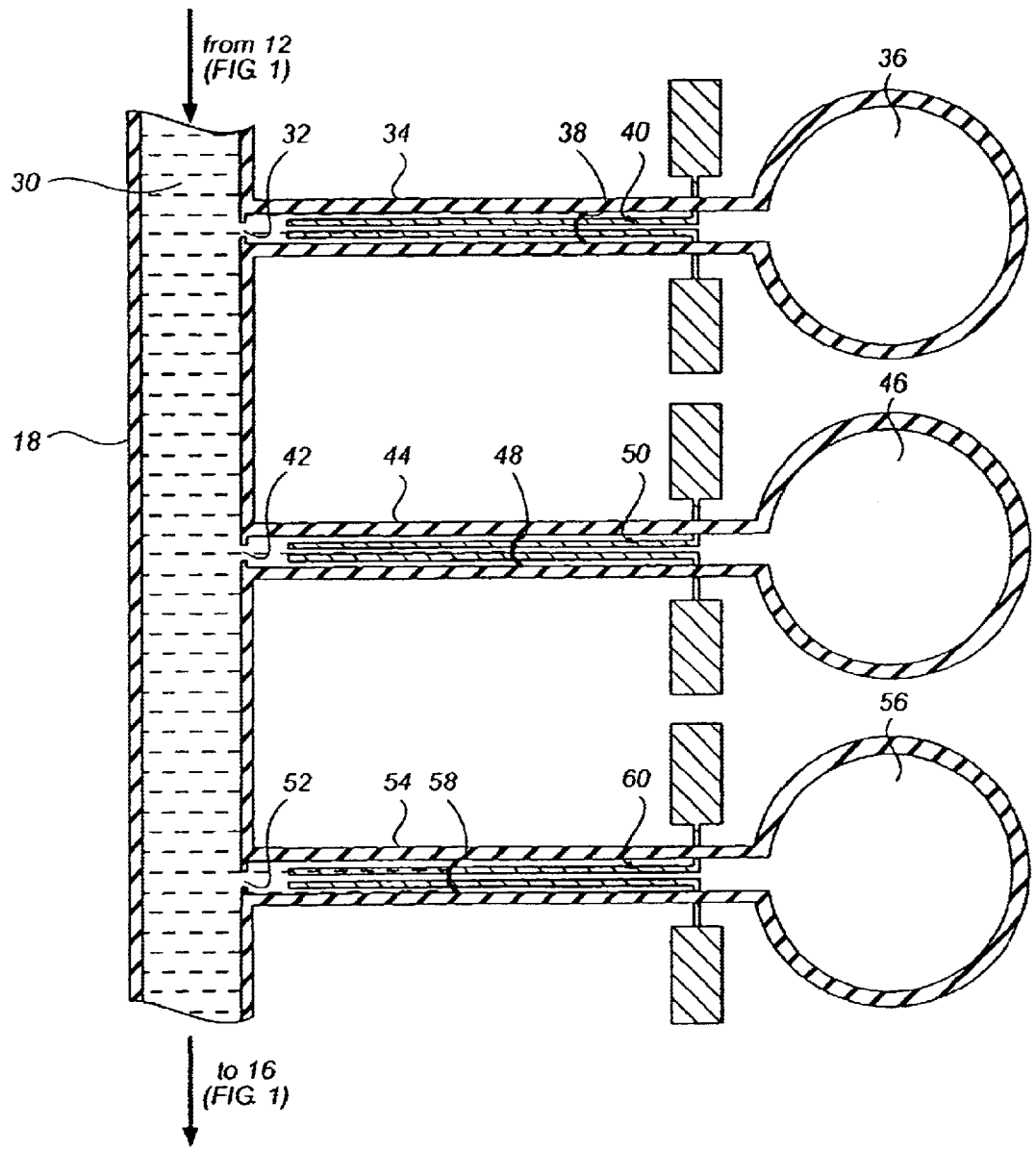
FIG. 3 is a schematic of a second embodiment of the present invention.

FIG. 3 depicts a second embodiment of the absolute static pressure sensor 20 shown in FIG. 1. Absolute static pressure is measured at multiple points along the microfluidic device 18. As with the first point of communication 32, a second point of communication 42 and any additional points of communication 52 should be kept as small as possible to minimize disruption to the flow in the microfluidic device 18. However, if the second point of communication 42 or any additional point of communication 52 is too small, the response time of the absolute static pressure sensor 20 will become large, since equilibration of the absolute static pressure sensor 20 will be limited by the rate at which fluid can flow through the second point of communication 42 or the additional point of communication 52, respectively. When the individually addressable printhead 16 is primed with a working fluid 30 (in this case ink) before use by the drive electronics 14, the microfluidic device 18 will fill with fluid. Depending on the pressure used to prime the absolute static pressure sensor 20, and the ambient pressure conditions upon filling, a certain amount of gas will be trapped within the first fluid conducting channel 34, the second fluid conducting channel 44, and any additional fluid conducting channels 54, forming an atmosphere provided by the first selected gas environment 36 at the end of the first fluid conducting channel 34, a second atmosphere provided by the second selected gas environment 46 at the end of the second fluid conducting channel 44, and forming an additional atmosphere provided by the additional selected gas environment 56 at the ends of the additional fluid conducting channel 54. The working fluid 30 is separated from the second selected gas environment 46 by a second interface 48. Similarly, the working fluid 30 is separated from the additional selected gas environment 56 by an additional interface 58. The second selected gas environment 46 and additional selected gas environment 56 include air, nitrogen, argon, neon, helium, oxygen, hydrogen, water vapor, carbon monoxide, or carbon dioxide or a miscible combination of these.

For non-inkjet microfluidic devices, there will be an initial filling of the microfluidic device 18 generally accomplished by forcing the working fluid 30 through the microfluidic device 18 using an external pressure source. In order to use the absolute static pressure sensor 20 the initial volume of this first selected gas environment 36 must be determined by electrically interrogating the first sensing mechanism 40 while the absolute static pressure sensor 20 is under ambient pressure. Similarly, the initial volume of the second selected gas environment 46 must be determined by electrically interrogating the second sensing mechanism 50, disposed adjacent to the second fluid conducting channel 44, while the absolute static pressure sensor 20 is under ambient pressure, and the initial volume of any additional selected gas environment 56 must be determined by electrically interrogating the additional sensing mechanism 60, disposed adjacent to the additional fluid conducting channel 54, while the absolute static pressure sensor 20 is under ambient pressure.

Subsequently during microfluidic device operation, electrical interrogation of the first sensing mechanism 40 determines the volume of the first selected gas environment 36, electrical interrogation of the second sensing mechanism 50 determines the volume of the second selected gas environment 46, and electrical interrogation of the additional sensing mechanism 60 determines the volume of the additional selected gas environment 56. Using the initial volume measured under ambient static conditions and an equilibrium operational volume measured while the microfluidic device 18 is in operation, the operational absolute static pressure is determined. Since a fixed amount of gas is trapped within each of the selected gas environments 36, 46, and 56, the following relation holds for each operational absolute static pressure, $P_2$, under isothermal equilibrium conditions as a direct result of the ideal gas law:

$$P_2 = P_1 \frac{V_1}{V_2}$$

where $P_1$ is the ambient absolute static pressure (measured with, for example, an external barometer) at which $V_1$, the initial volume, is measured and $P_2$ is the operational absolute static pressure at which $V_2$, the operational volume, is measured. As described above, more complex non-ideal and/or gas-specific relationships between $P_1$, $V_1$, $P_2$, and $V_2$ is used for this calculation to model, for example diatomic vs. monatomic gases.

After calculating the absolute static pressure at each point of communication 32, 42 or 52, the static pressure differential from one point of communication 32, 42 or 52, to another is determined by subtracting the calculated absolute static pressures from one another. By dividing the static pressure differential between two points of communication 32, 42 or 52, by the distance between the two points of communication 32, 42 or 52, an average static pressure gradient between the two absolute static pressure sensors 20 is determined. Using the physical properties of the working fluid in combination with predetermined formulae for laminar flow in microfluidic channels with various geometrical cross sections (see, for example, *Viscous Fluid Flow* by Frank White, second edition, pp. 119–121) the flow rate can then be determined. For one specific example, a microfluidic device with rectangular cross-section (a common cross-section for micromachined microfluidic channels), the flow rate would be determined by the following equation:

$$Q = \frac{4ba^3}{3\mu}\left(\frac{-\Delta P}{\Delta L}\right)\left[1 - \frac{192a}{\pi^5 b}\sum_{i=1,3,5,...}^{\infty}\frac{\tanh(i\pi b/2a)}{i^5}\right]$$

where Q is the flow rate of a working fluid of absolute viscosity $\mu$ through a rectangular microfluidic device of width $2a$ and height $2b$, and $\Delta P$ is the measured static pressure differential between two points of communication 32, 42, and/or 52 separated by a distance $\Delta L$. Furthermore, by performing this calculation between several combinations of points of communication, the accuracy of the flow rate calculation is confirmed. This capability also lends itself to analysis of microfluidic device clogging, localization of the region of failure of the microfluidic device 18. When the absolute static pressure downstream of a particular region drops while the upstream absolute static pressure remains constant, the source of the static pressure differential must be between the upstream and downstream absolute static pressure sensor.

Figure 4:
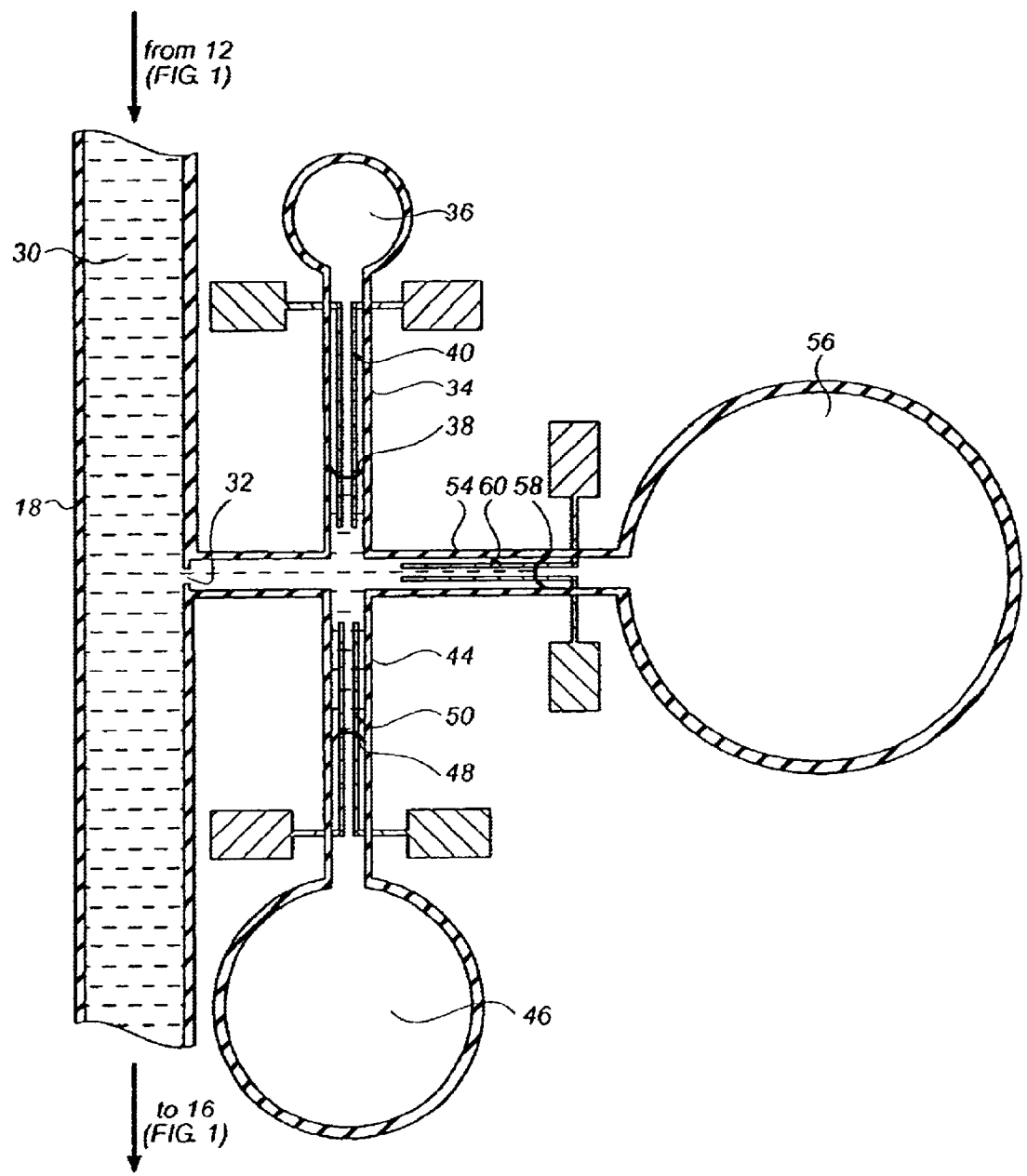
FIG. 4 is a schematic of another embodiment of the present invention.

FIG. 4 depicts a third embodiment of the absolute static pressure sensor 20 shown in FIG. 1, that measures absolute static pressure over several pressure ranges at its single first point of communication 30 with the microfluidic device 18. This is done by providing at least one additional fluid conducting channel in direct communication with the first fluid conducting channel and providing an atmosphere by an additional selected gas in a sealed environment for such additional fluid conducting channel and an additional sensing mechanism disposed adjacent to the additional fluid conducting channel and wherein the additional selected gas environment associated with the additional fluid conducting channel has a different volume to cross-sectional area ratio than the first selected gas environment in the first fluid conducting channel. By varying the ratio of the volume of the selected gas environments 36, 46 or 56 to the cross-sectional areas of their respective fluid conducting channels 34, 44 or 54, an absolute static pressure sensor 20 is created that can measure absolute static pressure over a variety of ranges, since the displacement of each interface 38, 48 or 58 is determined by the following relationship:

$$\Delta x = \frac{-\Delta V}{A} = \frac{\Delta P}{P_1}\frac{V_2}{A}$$

where Δx is the change in interface 38, 48 or 58 position, ΔV is the change in the volume of the corresponding selected gas environment 36, 46 or 56, and A is the cross-sectional area of the microfluidic channel. When the absolute static pressure sensor 20 experiences small changes of the absolute static pressure from ambient static pressure in the working fluid 30 at the first point of communication 32, the volume of the selected gas environment 36, 46 or 56 will show a correspondingly small change in volume.

In the embodiment depicted in FIG. 4, the displacement from equilibrium of the first fluid interface 38 would be less than the displacement of the second fluid interface 48, which in turn would be less than the displacement of the additional interface 58. This is magnified by using a larger additional selected gas environment 56, so that the change in volume ΔV is more evident, and/or by making the additional fluid conducting channel 54 narrower, so that the cross-sectional area A of the additional fluid conducting channel 54 decreases, increasing the linear displacement Δx of the additional interface. Thus, a narrow fluid conducting channel 34, 44 or 54 and a large selected gas environment 36, 46 or 56 are advantaged in accurately measuring a small change in absolute static pressure, which might be undetectable in a wider fluid conducting channel 34, 44 or 54 with a smaller selected gas environment 36, 46 or 56. However, the same sensor would not be able to measure large absolute static pressure changes, since the change in volume would compress the selected gas environment 36, 46 or 56 to a point where the interface 38, 48 or 58 position could no longer be measured by electrically interrogating the sensing mechanism 40, 50 or 60. By using additional sensors in communication with the microfluidic device 18 at the same point of communication 32, the higher absolute static pressure is measured on a coarser scale. Thus, an absolute static pressure sensor 20 combining a number of fluid conducting channels 34, 44 or 54 and selected gas environments 36, 46 or 56 with different volume to cross-sectional area ratios can measure absolute static pressure over a variety of pressure ranges at the same point of communication, thereby increasing the effective absolute static pressure range of the sensor.

The invention has been described in detail with particular reference to certain preferred embodiments thereof, but it will be understood that variations and modifications can be effected within the spirit and scope of the invention.

PARTS LIST

10 Printing apparatus
12 Ink reservoir
14 Drive electronics
16 Individually addressable printhead
18 Microfluidic device
20 Absolute static pressure sensor
22 Computer
24 Data
26 Transport mechanism
28 Receiver
30 Working fluid
32 First point of communication
34 First fluid conducting channel
36 First selected gas environment
38 First interface
40 First sensing mechanism
42 Second point of communication
44 Second fluid conducting channel
46 Second selected gas environment
48 Second interface
50 Second sensing mechanism
52 Additional point of communication
54 Additional fluid conducting channel
56 Additional selected gas environment
58 Additional interface
60 Additional sensing mechanism

What is claimed is:

1. A method of measuring absolute static pressure at one or more positions along the wall of a microfluidic device transporting a working fluid that is immiscible in a first selected gas environment, comprising:

(a) providing a first fluid conducting channel having an atmosphere provided by the first selected gas environment in a sealed environment and in communication with the microfluidic device at a first point of communication;

(b) providing a first sensing mechanism that is electrically interrogated, disposed adjacent to the first fluid conducting channel; and (c) transporting the working fluid under pressure conducted by the microfluidic device into the first fluid conducting-channel such that the volume transported into such first fluid conducting channel varies depending upon the absolute static pressure of the working fluid at the first point of communication, whereby the absolute static pressure at the first point of communication is electrically determined by the first sensing mechanism depending on the position of the interface of the working fluid and the first selected gas environment in the first fluid conducting channel.

2. The method of claim 1 further including providing a second fluid conducting channel and a second sensing mechanism disposed adjacent to the second fluid conducting channel and in communication with the microfluidic device at a second point of communication whereby the static pressure differential in the microfluidic device between the first and second points of communication is electrically determined by the first and second sensing mechanism.

3. The method of claim 1 further including at least one additional fluid conducting channel in direct communication with the first fluid conducting channel and providing an atmosphere by an additional selected gas in a sealed environment for such additional fluid conducting channel and an additional sensing mechanism disposed adjacent to the additional fluid conducting channel and wherein the additional selected gas environment associated with the additional fluid conducting channel has a different volume to cross-sectional area ratio than the first selected gas environment in the first fluid conducting channel.

4. The method according to claim 1 wherein the first selected gas includes air, nitrogen, argon, neon, helium, oxygen, hydrogen, water vapor, carbon monoxide, or carbon dioxide or a miscible combination of these.

5. The method according to claim 1 wherein the working fluid includes water, ink, ethylene glycol, methanol, ethanol, isopropanol, oil, acetone, an organic solvent, a biological fluid, or a solution of a chemical analyte, or a miscible combination of these.

6. A method of measuring flow rate between two or more positions along a microfluidic channel transporting a working fluid that is immiscible in a first selected gas environment, comprising:

(a) providing a first fluid conducting channel having an atmosphere provided by the first selected gas environment under a sealed environment and in communication with the microfluidic channel at a first point of communication;

(b) providing a first sensing mechanism that is electrically interrogated, disposed adjacent to the first fluid conducting channel;

(c) transporting the working fluid under pressure conducted by the microfluidic channel into the first fluid conducting channel such that the volume transported into such first fluid conducting channel varies depending upon the absolute static pressure of the working fluid in the microfluidic channel at the first point of communication, whereby the absolute static pressure at the first point of communication is electrically determined depending on the position of the first interface of the working fluid and the first selected gas environment in the first fluid conducting channel when the first sensing mechanism is electrically interrogated;

(d) providing a second fluid conducting channel having an atmosphere provided by the second selected gas under a sealed environment and in communication with the microfluidic channel at a second point of communication;

(e) providing a second sensing mechanism that is electrically interrogated, disposed adjacent to the second fluid conducting channel;

(f) transporting the working fluid under pressure conducted by the microfluidic channel into the second fluid conducting channel such that the volume transported into such second fluid conducting channel varies depending upon the absolute static pressure of the working fluid in the microfluidic channel at the second point of communication, whereby the absolute static pressure at the second point of communication is determined depending on the position of the second interface of the working fluid and the second selected gas environment in the second fluid conducting channel when the second sensing mechanism is electrically interrogated;

(g) providing an additional fluid conducting channel having an atmosphere provided by an additional selected gas under a sealed environment and in communication with the microfluidic channel at an additional point of communication;

(h) providing an additional sensing mechanism that is electrically interrogated, disposed adjacent to the additional fluid conducting channel;

(i) transporting the working fluid under pressure conducted by the microfluidic channel into the additional fluid conducting channel such that the volume transported into such additional fluid conducting channel varies depending upon the absolute static pressure of the working fluid in the microfluidic channel at the additional point of communication, whereby the absolute static pressure at the additional point of communication is electrically determined depending on the position of the additional interface of the working fluid and the additional selected gas environment in the additional fluid conducting channel when the additional sensing mechanism is electrically interrogated;

(j) calculating the average static pressure gradient between any two of the points of communication by dividing the difference in absolute static pressure measured at the two points of communication by the separation distance between the two points of communication; and (k) calculating the flow rate of the working fluid through the microfluidic channel between any two of the points of communication from the average static pressure gradient between any two of the points of communication and the physical properties of the working fluid as function of the cross-sectional area of a microfluidic channel formed in the microfluidic device and the viscosity of the working fluid in the microfluidic device.

7. The method of claim 6 further including at least one additional fluid conducting channel in direct communication with the first fluid conducting channel and providing an atmosphere by an additional selected gas environment in a sealed environment for such additional fluid conducting channel and an additional sensing mechanism disposed adjacent to the additional fluid conducting channel and wherein the additional selected gas environment associated with the additional fluid conducting channel has a different volume to cross-sectional area ratio than the first selected gas environment in the first fluid conducting channel.

8. The method according to claim 6 wherein the first, second, and additional selected gases include air, nitrogen, argon, neon, helium, oxygen, hydrogen, water vapor, carbon monoxide, or carbon dioxide, or a miscible combination of these.

9. The method according to claim 6 wherein the working fluid includes water, ink, ethylene glycol, methanol, ethanol, isopropanol, oil, acetone, an organic solvent, a biological fluid, or a solution of a chemical analyte, or a miscible combination of these.

* * * * *